(12) United States Patent
Yamamura et al.

(10) Patent No.: US 6,533,838 B1
(45) Date of Patent: Mar. 18, 2003

(54) HIGH PURITY GALLIUM FOR PREPARATION OF COMPOUND SEMICONDUCTOR, AND METHOD AND APPARATUS FOR PURIFYING THE SAME

(75) Inventors: Takeharu Yamamura, Hachiouji (JP); Hidekazu Kato, Funabashi (JP); Takashi Ohgami, Edogawa-ku (JP); Kishio Tayama, Akita-ken (JP); Kanichi Okuda, Tokyo (JP)

(73) Assignee: Dowa Mining Co., Ltd., Tokyo (JP)

( * ) Notice: Subject to any disclaimer, the term of this patent is extended or adjusted under 35 U.S.C. 154(b) by 0 days.

(21) Appl. No.: 09/581,840

(22) PCT Filed: Oct. 27, 1999

(86) PCT No.: PCT/JP99/05943

§ 371 (c)(1),
(2), (4) Date: Jun. 19, 2000

(87) PCT Pub. No.: WO00/26422

PCT Pub. Date: May 11, 2000

(30) Foreign Application Priority Data

Oct. 29, 1998 (JP) .......................................... 10-309144

(51) Int. Cl.[7] .............................................. C22B 58/00
(52) U.S. Cl. ........................ 75/688; 75/10.14; 266/234; 266/239; 266/241; 366/136; 366/137; 366/147; 366/149; 366/191; 366/274
(58) Field of Search ................................ 75/688, 10.14; 266/234, 241, 239; 366/273, 274, 149, 147, 136, 137, 191

(56) References Cited

U.S. PATENT DOCUMENTS 3,991,163 A * 11/1976 Raab et al. .................. 423/299
4,362,560 A * 12/1982 Abrjutin et al. ............... 75/688
5,458,669 A * 10/1995 Maeda et al. ................. 75/688

FOREIGN PATENT DOCUMENTS

| JP | 62-270494 | 11/1987 |
| JP | 63-242996 | 10/1988 |
| JP | 64-4434 | 1/1989 |
| JP | 2-50926 | 2/1990 |
| JP | 2-50927 | 2/1990 |
| JP | 2-243727 | 9/1990 |
| JP | 2-53500 | 11/1990 |
| JP | 6-136467 | 5/1994 |

OTHER PUBLICATIONS

Derwent Acc. No. 1990–009402 by Dhondt et al; EP 349449 A, Jan. 3, 1990.*

* cited by examiner

Primary Examiner—Roy King
Assistant Examiner—Tima McGuthry-Banks
(74) Attorney, Agent, or Firm—McDermott, Will & Emery

(57) ABSTRACT

In a process for separating impurities from a raw gallium material containing impurities, a process for refining gallium comprising progressively solidifying a raw gallium material provided in a liquid state inside a vessel while applying stirring, such that the diameter of the tubular solidification boundary gradually advances from the inner wall plane of the vessel towards the center of the vessel to reduce the diameter of the tubular solidification boundary, and separating the liquid phase remaining in the central portion of the vessel from the solidified phase before the entire raw material inside the vessel is solidified. The process above is repeated as required by using, as the raw gallium material, the solidified phase from which the liquid phase is separated. A metallic gallium favorably used for the preparation of a compound semiconductor can be obtained by analyzing the impurity concentration of the impurity-concentrated Ga separated from the solidified layer.

10 Claims, 7 Drawing Sheets

HIGH PURITY GALLIUM FOR PREPARATION OF COMPOUND SEMICONDUCTOR, AND METHOD AND APPARATUS FOR PURIFYING THE SAME

TECHNICAL FIELD OF THE INVENTION

The present invention relates to a refining process and an apparatus for metallic gallium (Ga), and it further refers to a high purity Ga suitable for obtaining a compound semiconductor such as a GaAs single crystal.

BACKGROUND OF THE INVENTION

Among the compound semiconductors, the Group III-V compounds, particularly GaAs single crystals, are widely used as the substrates of electronic devices and optical devices such as high speed ICs and photoelectronic integrated circuits because they not only have superior high electron mobility which is about five times as high as that of an elemental semiconductor such as silicon, but also exhibit excellency in, for example, high frequency characteristics, magnetic conversion functions, photoreceptor functions and light emitting functions.

Wafers of GaAs single crystal are manufactured through various processes. The basic process thereof must comprise a step of growing GaAs crystals from a melt of Ga—As and a step of slicing them into wafers. A wafer (semi-insulating GaAs substrate) thus prepared is then subjected to selective ion injection or various types of epitaxial growth processes to finally obtain the desired semiconductor device element.

In using a GaAs single crystal (GaAs ingot) as a semi-insulating substrate, it is an indispensable requirement that the single crystal stably maintains a specific resistance (referred to hereinafter as resistivity) of $1 \times 10^7$ Ω·cm or higher. Although it is most desirable to obtain an intrinsic GaAs single crystal completely free from impurities and lattice defects, it is practically difficult to produce such an intrinsic GaAs single crystal of high purity because of the unavoidable crystal defects and residual impurities. As a reason for causing such difficulties, there can be mentioned the presence of impurities that accompany the raw material for Ga (gallium) used in the step of growing a GaAs crystal from the Ga—As melt.

In growing a GaAs crystal from a Ga—As melt, generally used is the LEC (Liquid Encapsulated Czocralski) process. This process comprises covering the surface of a Ga—As melt placed inside a crucible with $B_2O_3$, and pulling up a seed crystal of GaAs through the $B_2O_3$ layer while rotating the melt and applying pressure in an inert gas atmosphere. In carrying out this process, various improvements are devised to reduce the incorporation of impurities into the GaAs single crystal as much as possible, such as using a crucible made of PBN (Pyrolytic Boron Nitride) or controlling the gaseous atmosphere.

In spite of the improvements made on the constitution of the apparatus and on the process conditions, the probability of incorporating the impurities into the GaAs single crystal increases if the concentration of impurities incorporated in the starting melt from which the GaAs crystal is grown remains high. That is, it is still difficult to obtain a high quality GaAs single crystal if the purity of the raw materials for Ga and As remains low. Among the impurities which accompany the raw materials for Ga and As, there certainly are impurity elements having a low segregation index that are less incorporated into the growing crystal and reside in the melt; however, from the viewpoint of improving the yield in producing GaAs single crystals, it is still undesirable to result in a melt containing impurity elements at high concentration. Accordingly, the concentration of impurities in the raw materials for Ga and As is preferably as low as possible and it is further desirable to previously recognize the type and content of each impurity present in the raw material.

Concerning the raw materials for Ga and As for use in producing GaAs single crystals, it is relatively easy to find a commercially available high purity As (arsenic) having a purity of 7N (seven nines; stands for a 99.99999% purity, and is sometimes used hereinafter to express the purity). However, the case for raw Ga materials is not so simple. Any raw Ga material contains, to some extent, a variety of impurities in various forms depending on its origin, and, the quantity of the impurities fluctuates in general. It is therefore difficult to stably obtain a raw Ga material free from impurities which are inconvenient for the production of GaAs single crystals. Furthermore, with the present day analytical technology (glow discharge mass spectrometer) for analyzing the content of the impurity elements present in metallic Ga, it is difficult to obtain reliable results for each of the components incorporated at a level of 0.01 ppm or lower. It can be understood therefrom that it is even difficult to know the exact concentration of each of the impurity elements contained in trace quantities in the raw Ga material to be used for the production of GaAs single crystals.

In addition to the aforementioned GaAs single crystals, compound semiconductors using Ga include GaP, GaN, etc. Because a GaP single crystal has excellent photoreceptor and light emitting functions, it is used as a substrate for optical devices such as light emitting devices. A GaP single crystal wafer is produced by first synthesizing a polycrystalline GaP, pulling up the polycrystalline GaP as a GaP single crystal and by means of a process similar to, for example, the aforementioned LEC process, and slicing the resulting GaP single crystal ingot. A light emitting device can be finally obtained by performing liquid layer expitaxy. To obtain a light emitting device of high luminance in this case, the incorporation of impurities in the GaP single crystal substrate must be suppressed to the lowest limit. Particularly harmful are the impurities which increase the concentration of the carriers on synthesizing the polycrystalline GaP and lowers the resistivity. Similar to the case of GaAs, furthermore, the incorporation of such harmful impurities is believed to be originated from the raw Ga material in many cases.

As a process for refining metallic gallium to remove impurities from the raw materials, conventionally known processes include acid processing, electrolytic smelting, zone melting, pulling up crystals, recrystallization by melting and solidification, etc. Among these processes, the recrystallization process comprising melting and solidification is advantageous in that it enables refining using a relatively simple installation and operation. In solidifying a liquid of a raw gallium material containing an impurity, there is known a phenomenon as such that the impurity concentration of the crystal becomes lower than that of the residual liquid. The principle of this process is based on this phenomenon.

For the process of refining gallium by utilizing the phenomenon above, proposals for improving the process conditions and operations can be found in, for example, JP-A-Sho62-270494 (the term "JP-A-" as referred herein signifies "an unexamined published Japanese patent application"), JP-A-Sho63-242996, JP-A-Hei2-50926, JP-A-Hei2-50927, JP-B-Hei2-53500 (the term "JP-B-" as referred herein signifies "an examined published Japanese patent application") JP-A-Hei6-136467, etc.

OBJECT OF THE INVENTION

At present, in producing compound semiconductors such as GaAs and GaP, it is practically impossible to obtain a highly pure metallic gallium having a purity of 6N or 7N or even higher and also provided with reliable analytical data for each of the impurity contents. Since this caused a problem in producing high quality compound semiconductors such as GaAs and GaP, a first object of the present invention is to overcome this problem.

Among the prior art technologies for producing high purity gallium, the recrystallization process using melting and solidification comprises separating the crystalline gallium (solid phase) containing impurities at a low concentration level from the residual liquid (liquid phase) containing impurities at a higher concentration, and is based on the concept of separating the solid phase from the liquid phase differing in impurity concentration. In order to separate the high purity solid phase from the liquid phase, it is necessary to separate the solid phase when the residual liquid is still present at a relatively large quantity. This inevitably results in a low yield of high purity gallium.

For instance, in JP-A-Hei6-136467 is disclosed a process which comprises inserting a cooled tube into the central portion of the molten raw gallium material placed inside a vessel, thereby allowing solid gallium to precipitate on the surface of the tube, and then pulling up the resulting tube having thereon the precipitated gallium. The disclosure teaches, however, that it is preferred to complete the operation of precipitation at a stage that the solidification ratio (the ratio of the precipitate) accounts for 30 to 40%, and that even under the most controlled conditions, the solidification ratio attainable is in the range of 60 to 70%. Accordingly, this results in a large quantity of gallium remaining in the liquid phase, and this limits the yield of the refined product.

The recrystallization process using melting and solidification is rarely adopted as a mass production technology to produce a high purity gallium having a high purity in the level of 6N or 7N in an industrial scale due to its poor controllability and productivity.

Accordingly, a second object of the present invention is to establish a process for producing high purity gallium at high yield and with superior controllability.

Furthermore, a third object of the present invention is to provide, for a high purity metallic gallium for use in the preparation of single crystals of compound semiconductors such as GaAs and GaP, a means to recognize the concentration of each of the impurities that are unable to reliably quantify their concentration by the existing analytical method using glow discharge mass spectrometer; at the same time, it is also the object of the present invention to provide a high purity gallium containing such impurities in a trace level, but with given approximate concentration.

DISCLOSURE OF THE INVENTION

According to an aspect of the present invention, there is provided in a process for separating impurities from a raw gallium material containing impurities, a process for refining gallium comprising progressively solidifying a raw gallium material provided in a liquid state inside a vessel while applying stirring, such that the diameter of the tubular solidification boundary gradually advances towards the center of the vessel to reduce the diameter of the tubular solidification boundary, and separating the liquid phase remaining in the central portion of the vessel from the solidified phase before the entire raw material inside the vessel is solidified.

In the process above, the stirring can be applied by a magnetic field, and particularly, the stirring is preferably applied by a magnetic field in such a manner that a circular flow is generated in the liquid phase in the circumferential direction.

In the aforementioned refining process, the solidified phase inside the vessel can be molten again after separating the liquid phase remaining in the central portion of the vessel from the solidified phase, and by repeating the process above, the purity of the solidified phase can be progressively increased. In this case, the solid phase is preferably reserved as a seed crystal on the inner wall plane of the vessel on melting the solidified phase.

As an apparatus for performing the refining process above, there is provided an apparatus for refining gallium comprising a vessel having a cylindrical inner wall, a cooling zone attached to the outer peripheral plane of the vessel, a heating zone provided on the inner side of the inner wall of the vessel, a suction pipe installed at the central portion of the vessel, and a magnetic rotator placed on the lower side of the vessel. Furthermore, as another apparatus for performing the refining process above, there is provided an apparatus for refining gallium comprising a vessel having a cylindrical inner wall, a cooling and heating zone attached to the outer peripheral plane of the vessel, a suction pipe installed at the central portion of the vessel, and a magnetic rotator placed on the lower side of the vessel. In these apparatuses, a heating zone can also be provided at the bottom portion of the vessel and to the outer periphery of the suction pipe.

In addition to the aforementioned processes and apparatuses for refining gallium, an aspect of the present invention provides a high purity raw Ga material for use in the preparation of a compound semiconductor, characterized by a raw Ga material used for preparing a compound semiconductor which yields a difference $\Delta C = |\Sigma An - \Sigma Bn|$ of 5 ppm by atomic or lower when subjected to a "test method for impurity-concentrated Ga" as defined below, where $\Sigma An$ represents the total quantity of the components contained in the sample of an impurity-concentrated Ga, which is at least one element of group A components selected from the group consisting of B, Na, Mg, K, Ca, Cr, Mn, Fe, Co, Ni, Cu, Zn, Cd, Au, Hg, Pb, and Bi; and $\Sigma Bn$ represents the total quantity of the components contained in the sample of impurity-concentrated Ga, which is at least one element of group B components selected from the group consisting of F, Si, S, Cl, Ge, Se, Sn, and Te. "Test method for impurity-concentrated Ga" is defined as a test method comprising:

using an apparatus for refining gallium comprising a vessel, having a cylindrical inner wall made of a 3 mm thick SUS304 steel sheet provided with a 0.3 mm thick fluororesin coated inner wall plane, the vessel having an inner radius of 60 mm and a height of 40 mm, a cooling zone attached to the outer peripheral plane of the vessel, a suction pipe installed to the central portion of the vessel, and a magnetic rotator provided to the lower portion of the vessel;

filling the vessel with a raw Ga material in liquid state at a quantity as such that it amounts to 30 mm in height inside the vessel while purging the space inside the vessel with an inert gas; and obtaining a sample of impurity-concentrated Ga as follows:

while applying a circular flow of 100±10 rpm to the liquid raw Ga material by using the rotator, maintaining the liquid raw Ga material at a temperature of 29.6±0.5° C., and passing a cooling water at a temperature of 5° C. through the cooling zone, thereby allowing progressive solidification of the liquid to proceed from the inner wall of the vessel towards the central portion of the vessel at a solidification rate as such that the entire liquid may solidify in 60±5 minutes, then sampling the liquid phase through the suction pipe described above when the radius of the remaining liquid phase becomes 20 mm.

BEST MODE FOR CARRING OUT THE INVENTION

Figure 1:
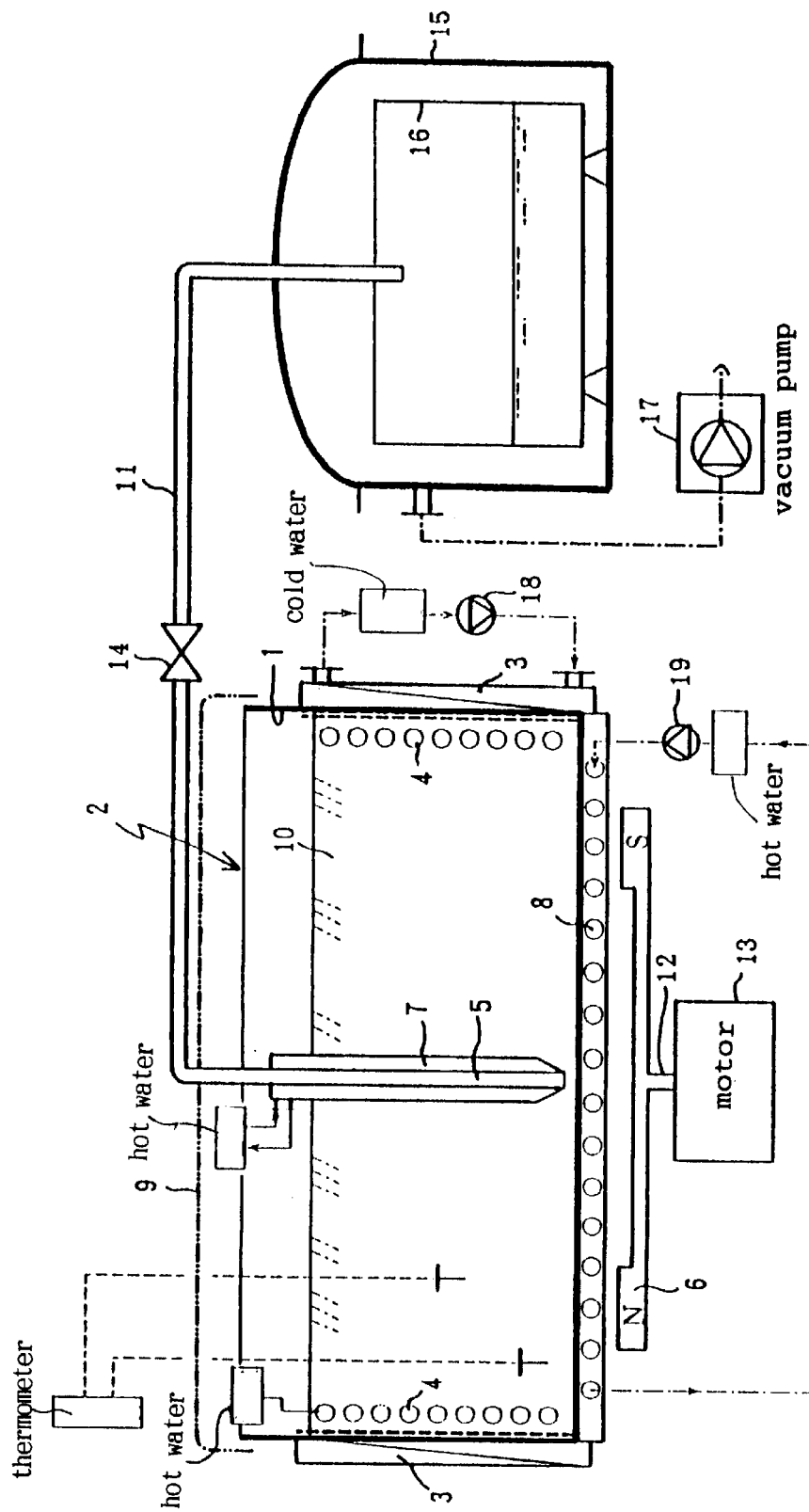
FIG. 1 is a system diagram showing an equipment allocation in an installation for performing a process according to the present invention.

Metallic gallium obtained from various types of Ga recovery processes or products of processed Ga-containing scraps contain trace quantities of Sn, In, Cu, Pb, Zn, Au, and other impurity elements, and, although it is possible to obtain a metallic gallium having a purity of about four nines by reducing the concentration of such impurities, the concentration is still high as a raw Ga material for use in the production of a GaAs single crystal. Accordingly, it is required to increase the purity of such raw Ga materials to a higher purity of, for instance, 6N or 7N, or to a even higher purity. The definition of the method for specifying the purity of Ga to 6N or 7N concentration is as follows.

By performing mass analysis on the elements to be analyzed specified in paragraph (1) below in accordance with paragraph (2), and for the impurities present at a quantitatively analyzed concentration exceeding the quantitative lower limit defined in paragraph (3), the total of the quantitatively obtained concentration values is subtracted from 100% by weight; the numerical value thus obtained in terms of the number of "9" is then defined as the purity (N) of a high purity gallium.

(1) Elements to be analyzed include 18 elements of Al, Si, P, Cl, K, Ca, Cr, Fe, Ni, Cu, Zn, Ge, As, In, Sn, Au, Hg, and Pb.

(2) Method of analysis: The refined gallium is heated and dissolved while thoroughly stirring, thereby obtaining a homogeneous sample. About 50 g portion per one refined unit is sampled to be subjected to the analysis. Quantitative analysis is then performed on the thus prepared sample by using a GDMS (glow discharge mass spectrometer) for each of the elements specified in paragraph (1) above.

(3) Lower limits of quantitative analysis: The lower limits of quantitative detection in accordance with the mass analysis specified in paragraph (2) above are as follows.

0.01 ppm (by weight): Al, Si, P, Cl, K, Ca, Cr, Fe, Ni, Cu, Zn, As, In, Sn, Hg, and Pb 0.1 ppm (by weight): Ge 0.2 ppm (by weight): Au The purity of a high purity Ga is specified as above because, with the present analytical technique using GDMS, reliable quantitative analysis on Ga can be performed only to a concentration of 0.01 ppm or higher for the elements in Ga (except for Ge and Au, which are 0.1 ppm or higher and 0.2 ppm or higher, respectively).

The present invention relates to an industrially advantageous process and apparatus for refining metallic gallium containing various types of impurity elements to produce metallic gallium having a higher purity. Although the process and the apparatus according to the present invention are applicable to any type of raw gallium materials so long as they contain gallium as the principal component, they are more advantageously applied to raw gallium materials having a purity in the range of from about 1 to 4 N.

The present inventors have found a fact that the refining of crystals can be performed at an extremely efficient manner by placing the raw gallium materials above in a vessel having a cylindrical inner wall and allowing the solidification to proceed from the inner wall side towards the center of the vessel while applying stirring. That is, in an ideal case of uniformly allowing the solidification to proceed from the inner wall plane of a cylinder in the direction headed to the center, the tubular boundary of solidification advances. in such a manner to gradually decrease the diameter of the tubular boundary of solidification; thus, the boundary area of solidification is gradually reduced. The behavior of this change in area is completely reverse to the case disclosed in the aforementioned JP-A-Hei6-136467. In the case of the disclosure, the diameter of the tubular solidification boundary extends from the surface of the tube immersed in the liquid gallium phase; that is, the solidification boundary in the prior art disclosure increases its area.

Furthermore, in the process according to the present invention, the liquid phase becomes cylindrical and the diameter of the cylindrical liquid phase decreases with the progress of solidification. However, the center of the liquid cylinder remains the same. Thus, the liquid phase containing impurities at a higher concentration accumulates on the central portion, and this facilitates the separation of the liquid phase with higher impurity concentration. For instance, the residual liquid at the central portion can be sucked out to easily perform the solid-liquid separation. This also allows the repetition of the refining operation, and results in a solidified phase with higher purity with increasing repetition times of the operation. Furthermore, because the liquid phase is obtained in a cylindrical form having a center, stirring of the liquid phase can be continuously applied in a uniform manner during solidification. This signifies that uniform stirring is performed during the progress of solidification in such a manner to prevent difference from occurring in the peripheral and the vertical direction of the solidification boundary. The fact that the stirring of the liquid phase is performed in a favorable manner, particularly, that the stirring is favorably performed at the solidification boundary, greatly contributes to the results obtained by the refining process for crystals according to the present invention. The liquid phase can be stirred by applying a magnetic field.

Thus, by allowing the solidification of the liquid raw gallium material to proceed from the cylindrical inner wall side towards the center while applying stirring, crystal refining can be achieved in an extremely efficient manner. Furthermore, even if the solidification is proceeded to such a degree that the liquid phase is accumulated at the central portion accounting for 10% by volume or less, or, in some cases, for about 5%, it is still possible to obtain a solidified phase with high purity.

The present invention is described below in further detail by way of preferred embodiments with reference to the attached drawings.

FIG. 1 shows an equipment allocation in a representative installation for performing a process according to the present invention. Referring to the figure, the apparatus for refining gallium comprises a vessel 2 having a cylindrical inner wall 1, a cooling zone 3 through which cold water is passed and attached to the outer peripheral plane of the vessel 2, a heating zone 4 comprising a coil through which hot water is passed through and provided on the inner side of the inner wall 1 of the vessel, a suction pipe 5 installed at the central portion of the vessel, and a rotator 6 made of a permanent magnet and placed at the lower portion of the vessel.

The vessel 2 shown in the figure is formed into a shape having a round bottom and a cylindrical wall by using a stainless steel plate, and it preferably has a lid 9. Preferably, the plane of the stainless steel sheet (for example, a SUS304 stainless steel sheet) that is brought into contact with liquid gallium is coated with a resin coating. In this manner, the components contained in the stainless steel can be prevented from migrating into gallium. Most preferred resin for use in the resin coating is fluororesin. As fluororesins, usable is PFA (Ethylene tetrafluoride-perfluoroalkoxyethylene copolymer). Similarly, the surface of the suction pipe 5 that is brought into contact with liquid gallium is preferably subjected to resin coating. In this manner, the members that are brought into contact with liquid gallium inside the vessel are preferably coated with a resin, and in some cases, the members may be formed with a resin. As the resin for the outermost surface layer, polypropylene and polyethylene resins can be used other than fluororesin.

Ideally, the cylindrical inner wall 1 has a cross section of true circle, but also acceptable are cases in which the cross section is formed as polygons having edge portions or ellipsoids. Thus, the term "cylindrical inner wall" refers to not only the cylindrical inner walls having a cross section of true circle, but also those having polygonal or ellipsoidal cross sections.

Referring to the figure, the cylindrical inner wall 1 is formed to have the same diameter along the entire length from the lower end to the upper end. However, in order to establish a heat conduction as such to form a cylindrical solidification boundary, it is also possible to form the cylinder having a circumferential plane in such a manner that the radius in the lower end may differ from that in the upper end. As such cylindrical forms, there can be mentioned a form having a smaller radius at the middle, or on the contrary, having an enlarged radius at the middle. Also, the cylinder may have a reduced diameter at the top or the bottom portion.

A cooling zone is provided to the outer peripheral plane of the vessel 2, and in the case shown in the figure, the cooling zone 3 is constructed by a water-cooling jacket 3 through which cold water is flown. The water-cooling jacket 3 is attached in such a manner that it surrounds the vessel 2. A water-cooling coil may be used in place of the water-cooling jacket, or various types of coolants can be used instead of cold water. At any rate, in an ideal case, the cooling zone is provided as such that it cools the raw gallium material 10 inside the vessel 2 uniformly in the circumferential direction and the vertical direction from the inner wall 1 of the vessel; i.e., the heat is uniformly emitted radially from the upper and the lower sides of the raw gallium material.

A heating zone 4 comprising a coil through which hot water is flown (referred to hereinafter as a hot water coil 4) is provided in the vessel on the inner side of the inner wall 1. The hot water coil 4 is provided slightly distant from the inner wall 1 of the vessel, and the pitch of the coil is taken sufficiently large so that the solidified phase may move between the coils. By flowing hot water through the hot water coil 4, the raw gallium material solidified inside the vessel can be molten, but by providing the hot water coil 4 at a distant from the inner wall 1, the portion which is brought into contact with the inner wall plane can be left without being molten (at this instance, cold water is flown through the cooling zone 3), and this portion being left in the form of solid can be reserved as a seed crystal for use in the next solidification.

A suction pipe 5 is located at the central portion of the vessel. The suction pipe is provided to discharge the residual liquid in the central portion out of the vessel. A heating zone 7 through which hot water is flown (referred to hereinafter as a hot water pipe 7) is provided to the outer peripheral plane of the suction pipe 5. By using the hot water pipe 7, heat can be applied to the residual liquid to maintain the liquid phase and to establish a smooth sucking of the liquid. Furthermore, the raw gallium material provided as a liquid to be processed may be fed into the vessel 2 by using this suction pipe 5. In such a case, a supply pipe equipped with a valve can be connected from the vessel filled with the liquid raw gallium material (not shown) to the suction piping 11 shown in the figure. The suction pipe 5 can be provided in such a manner that it can be slid vertically along the center axis of the vessel, and in some cases, it can be moved to the outside of the vessel.

Preferably, a heating zone 8 (referred to as a "hot water spiral pipe"), through which hot water is flown, is provided at the bottom of the vessel, so as to accelerate the melting of metallic gallium solidified inside the vessel, or to maintain the temperature of the metallic gallium inside the vessel to a predetermined temperature range. The hot water spiral pipe can be provided by placing a spiral pipe at the bottom of the vessel, so that hot water can be flown therethrough. Alternatively, a hot water jacket can be used in place of the spiral pipe.

A rotator 6 made of a permanent magnet is placed at the lower portion of the vessel. A magnetized rare earth magnet is used for the rotator 6, and stirring is performed by aligning the rotating axis 12 of the magnet with the center of the vessel, and by rotating it in the plane parallel to the bottom of the vessel around the center of the vessel using a motor 13. In this manner, stirring is applied to the liquid gallium by means of a magnetic force. Thus, the stirring of the liquid phase is applied by a circular flow produced by the rotation of the rotator 6.

On the other hand, the suction pipe 5 is connected to a vacuum vessel 15 via a suction piping 11 equipped with a valve 14. A ladle 16 is set inside the vacuum vessel 15, and the inside of the vacuum vessel 15 is maintained under reduced pressure by operating a vacuum pump 17. In FIG. 1, a cold water pump 18 is incorporated in the piping through which cold water is circulated between the cooling zone 3 and the coldwater source, while a hot water pump 19 is provided in a circuit for circulating hot water between the heating zone 8 and a hot water source.

Figure 2:
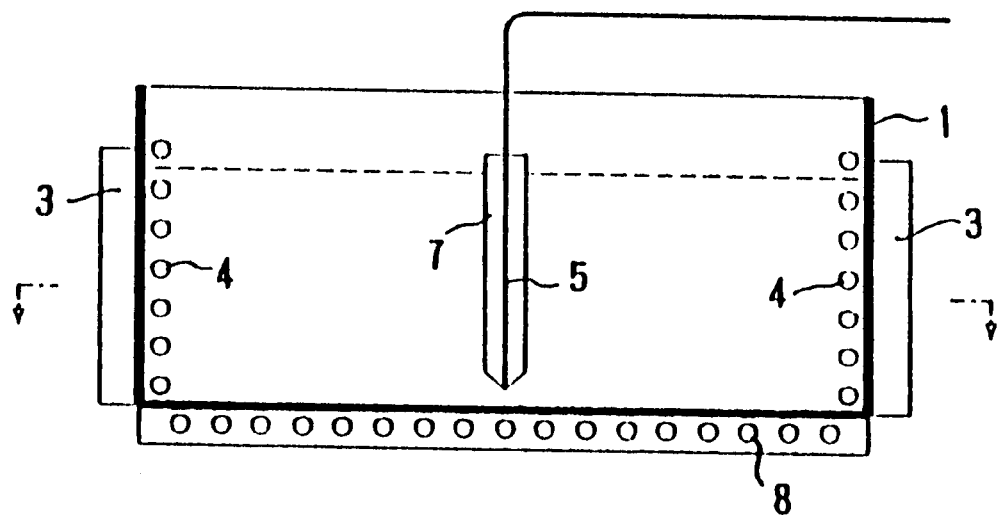
FIG. 2 is a schematically drawn cross section view for the refining vessel portion shown in FIG. 1.
Figure 3:
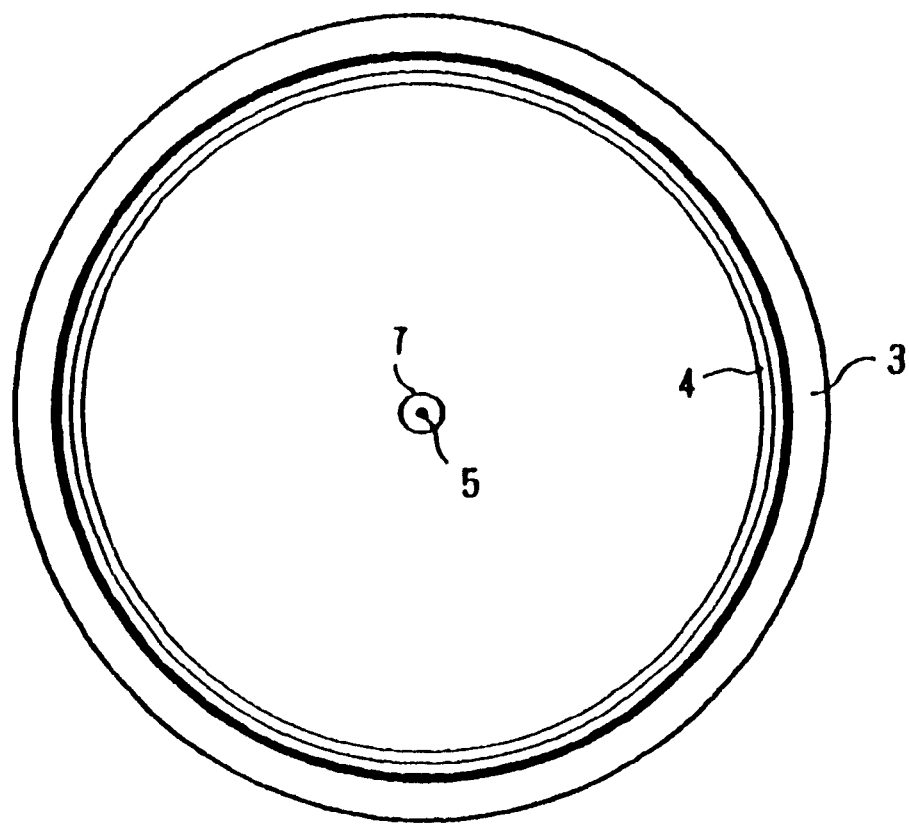
FIG. 3 is a cross section viewed from the direction shown by an arrow in FIG. 2.

FIG. 3 is the schematically shown cross section of the refining vessel viewed from the direction shown by an arrow in FIG. 2. Referring to FIG. 3, the water cooling jacket 3 is installed in contact with the outer periphery of the vessel 2, and the hot water coil 4 is installed concentrically at a distance from the inner plane of the vessel 2. The suction pipe 5 is provided at the center of the vessel.

The operation of refining gallium using the apparatus for refining gallium having the constitution above is described below. The refining operation is preferably carried out inside a clean room while maintaining the chamber at a temperature not lower than the melting point of gallium (e.g., at a temperature not lower than 30° C.). Further preferred is to perform the refining operation under a pressure slightly higher than the atmospheric pressure, using a refining vessel 2 provided with an airtight lid 9, and purging the atmosphere inside the vessel with an inert gas such as gaseous nitrogen or gaseous argon.

Figure 4:
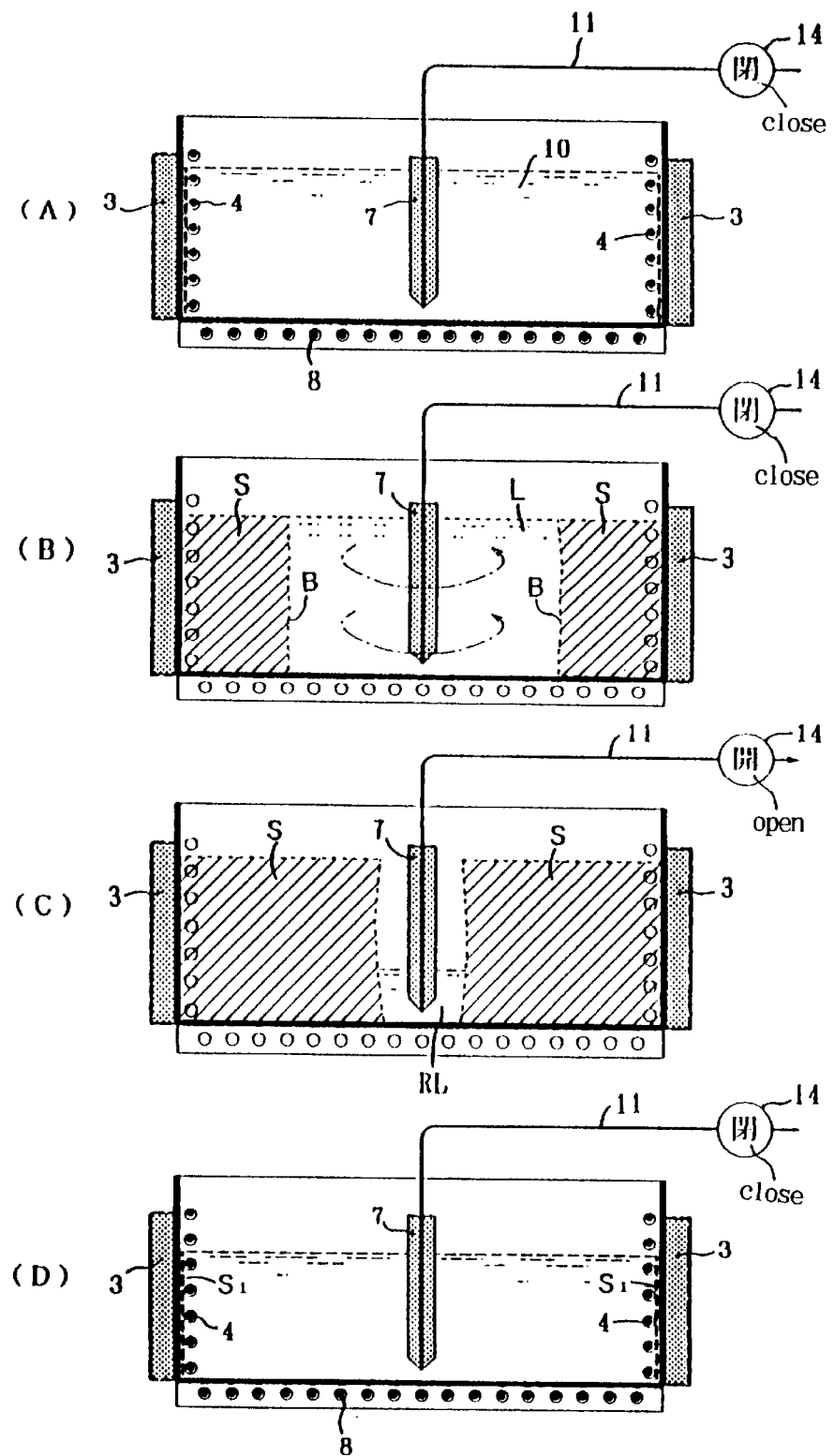
FIGS. 4(A) to 4(D) are an explanatory diagram showing the operation sequence in performing a process according to the present invention using the installation shown in FIG. 1.

FIG. 4 is a diagram showing the operation steps for refining gallium using the apparatus shown in FIG. 1. In FIG. 4(A) is shown the state of vessel 2 into which a liquid raw gallium material 10 is placed. In this state, the liquid raw gallium material 10 is maintained at a temperature not lower than the melting point by supplying hot water to the hot water coil 4 and the hot water pipe 7, while simultaneously supplying hot water to the heating zone (hot water spiral pipe) 8 at the bottom portion of the vessel. By flowing cold water to the water cooling jacket 3 at the same time, the solidified layer obtained in the previous stage can be reserved as seed crystals on the inner wall of the vessel.

FIG. 4(B) shows the state at the midway of solidification after initiating the solidification from the state shown in FIG. 4(A). In this state, the solidification proceeds in such a manner that the diameter of the tubular solidification boundary gradually advances towards the center of the vessel to reduce the diameter of the tubular solidification boundary by the operations as follows:

Driving the motor 13 of the magnetic rotator 6;
Supplying cold water to the water cooling jacket 3;
Stopping hot water supply to the hot water coil 4;
Stopping hot water supply to the hot water spiral pipe 8; and
Supplying hot water to the hot water pipe 7.

Accordingly, while being stirred, the liquid phase gradually reduces its diameter into a cylinder having a smaller diameter to be remained at the central portion. Referring to FIG. 4(B), more specifically, the solidification boundary B between the solidified phase S shown as the hatched portion and the liquid phase L shown by the non-hatched portion gradually reduces its diameter toward the center of the vessel.

In this instance, the liquid phase L at the central portion is prevented from being solidified because hot water is flown through the hot water pipe 7 of the suction pipe, and stirring using the magnetic force can be favorably maintained. In particular, if the solidification boundary B is provided in the form of a cylinder with a center located at the center of the vessel, a circular flow can be imparted to the liquid phase L by the rotator 6 being rotated around the center axis. Thus, a favorable flow generates uniformly in the liquid phase in the vicinity of the solidification boundary B. In this manner, favorable stirring is performed on the entire boundary in the liquid side where solidification is in progress, and the segregation of impurity elements in this portion can be suppressed. Furthermore, from the viewpoint on the solidified phase S, the area for growing the crystal is gradually reduced because the solidification area gradually decreases due to the gradual reduction in diameter of the solidification boundary B. Thus, by the favorably performed stirring and the reduction in diameter of the solidification boundary, the impurity elements are prevented from being entrained in the solidified phase, and as a result, gallium can be refined at a high yield. Ideally, the solidification boundary B has little difference in radius along the vertical direction and is cylindrical with a cross section near to true circle, but in the practical operation, the influence of having some difference in radius or of not having a cross section of true circle is not so serious.

FIG. 4(C) shows a state in which the solidification is further proceeded from the state shown in FIG. 4(B), and the residual liquid RL remaining in the central portion of the vessel is separated from the solidified phase S just before the entire raw material in the vessel is solidified. The operation of the apparatus is continued in a manner similar to the operation performed in the state shown in FIG. 4(B), except that the valve 14 provided to the piping 11 connected to the vacuum vessel 15 is opened to draw out the residual liquid RL through the suction pipe 5 from the central portion of the vessel. Because the residual liquid RL contains the impurities present in the raw gallium liquid 10, the impurities can be removed from the raw gallium liquid 10 by drawing out the residual liquid RL. The concentration of the impurities in the residual liquid increases with decreasing the amount of residual liquid. In the process according to the present invention, the incorporation of impurities into the solidified phase can be suppressed even if the solidification ratio (i.e., the ratio of the volume of the solidified phase to that of the raw liquid material) is increased to 90% or higher, or in some cases, to 95% or higher. Accordingly, the solidification can be proceeded to a state in which the amount of residual liquid is small. This also implies that the repetition times of remelting and solidification can be increased, and thereby high purity gallium can be collected at a high yield.

FIG. 4(D) shows a state in which the solidified phase remaining in the vessel after the residual liquid RL is drawn out in the previous state shown in FIG. 4(C) is remolten. Remelting is performed by the same operation as that employed in the step shown in FIG. 4(A) above. By supplying cold water to the water-cooling jacket 3 while flowing hot water through the hot water coil 4 in this case, remelting can be performed while maintaining the solidified phase present in the vicinity of the inner wall of the vessel at a temperature not higher than the melting point. Thus, a part of the solidified phase remaining in the vicinity of the inner wall of the vessel can be reserved as seed crystals $S_r$. The seed crystals S. can be left in a state directly attached to the inner wall of the vessel, but in order to assure the presence of the crystal nuclei, it is preferred to leave many seed crystals in spots. For this purpose, it is effective to provide irregularities on the inner wall of the vessel; or, in some cases, members such as mesh members and porous plates may be provided to the inner wall of the vessel to facilitate the generation of seed crystals in a large quantity.

By repeating the sequence of steps A to D above, gallium with a higher purity can be obtained inside the vessel 2 every time the sequence is repeated, while gallium with a lower purity is collected inside the ladle 16 provided in the vacuum vessel 15. The process according to the present invention which repeats the sequence above comprises, in other words, increasing the purity of the raw material inside the vessel by drawing out the concentrated impurity portions from the vessel in small quantities. Thus, this is an extremely efficient refining operation. Since the control operation for each of the process steps is simple, the entire process excels in operability, and automatic control can be easily introduced thereto.

Figure 5:
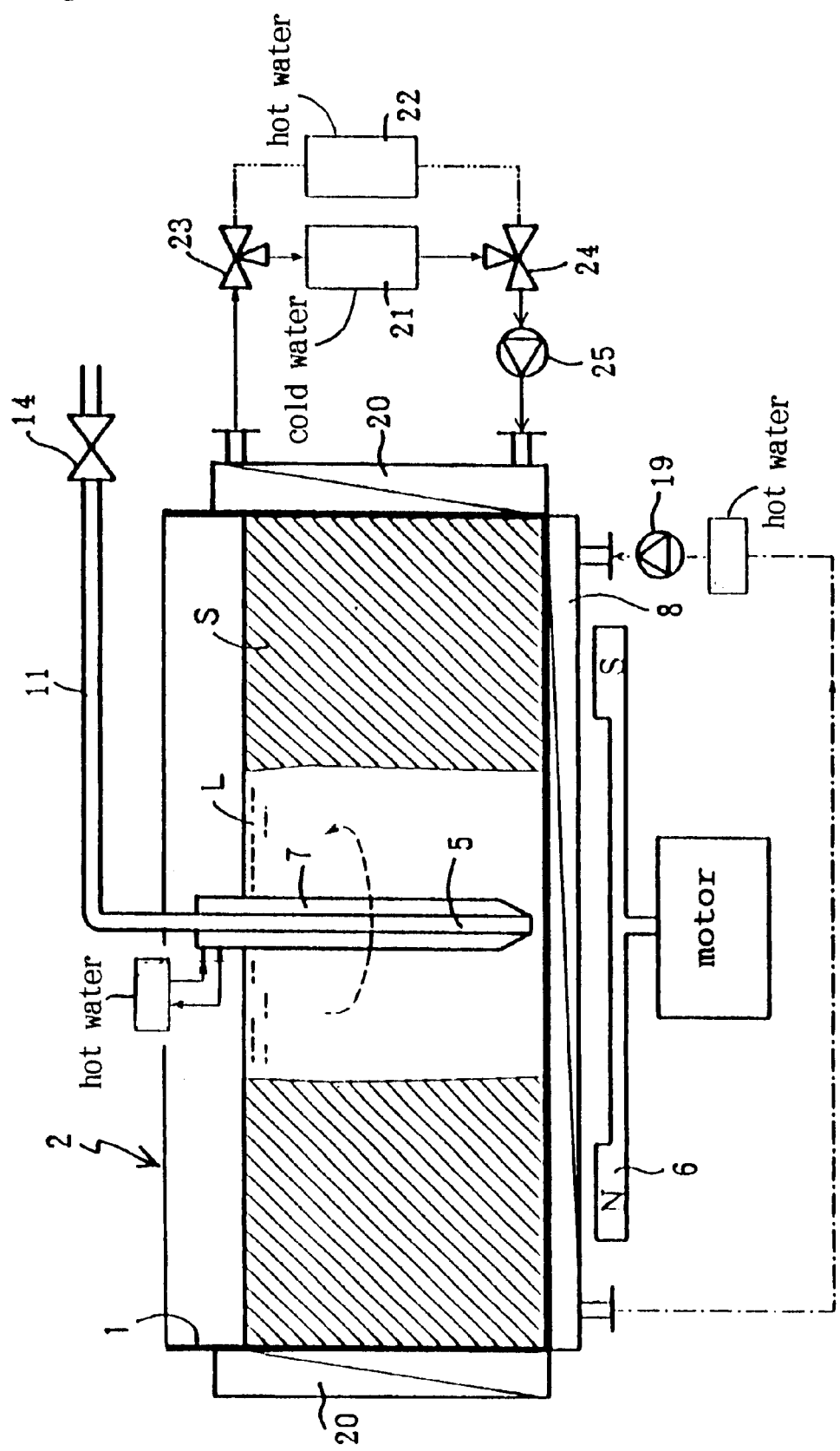
FIG. 5 is a system diagram showing another equipment allocation in an installation for performing a process according to the present invention.

FIG. 5 is a diagram showing an equipment allocation in another installation for performing a process according to the present invention. Referring to the figure, the apparatus for refining gallium comprises a vessel 2 having a cylindrical inner wall 1, a cooling and heating zone 20 attached to the outer peripheral plane of the vessel 2, a suction pipe 5 installed at the central portion of the vessel, and a rotator 6 made of a permanent magnet and placed at the lower portion of the vessel. Furthermore, a heating zone 7 through which a hot water is flown is provided to the outer periphery of the suction pipe 5, and another heating zone 8 through which a hot water is flown is provided at the bottom portion of the vessel. Cold water or hot water is provided from a cold water source 21 or a hot water source 22 to the cooling and heating zone 20 by switching from one to the other.

Figure 6:
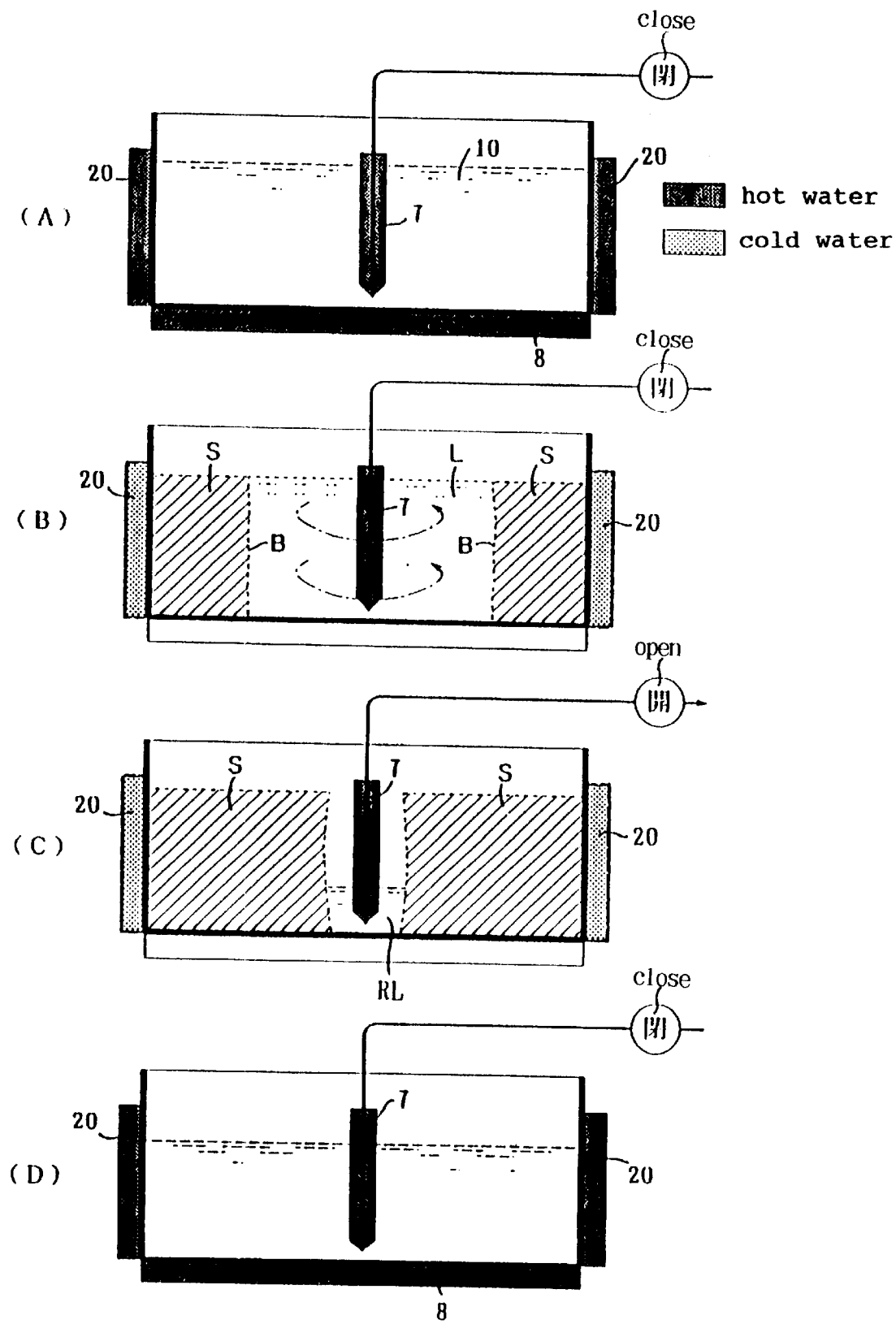
FIGS. 6(A) to 6(B) are an explanatory diagram showing the operation sequence in performing a process according to the present invention using the installation shown in FIG. 5.

The structure of the apparatus shown in FIG. 5 is substantially the same as that shown in FIG. 1, except for removing the hot water coil 4 from the apparatus shown in FIG. 1 and for replacing the water cooling jacket 3 by a cooling and heating zone 20 to which cold water or hot water is switchably supplied. The cooling and heating zone 20 is constructed similarly to the jacket shown in FIG. 1 in a manner that it surrounds the outer peripheral plane of the vessel 2, and cold or hot water is supplied to the jacket. More specifically, the cold water source 21 and the hot water source 22 are communicated with the jacket by the switching operation of three way valves 23 and 24, and cold water or hot water is supplied to the jacket by driving the pump 25. The switching operation for the hot water and the cold water is carried out in such a manner that a process similar to that explained with reference to FIG. 4 can be performed on the apparatus shown in FIG. 1. An example of the operation steps is shown in FIG. 6.

FIG. 6(A) shows the state of the vessel 2 into which a liquid raw gallium material 10 is placed. In this state, the liquid raw gallium material 10 is maintained at a temperature not lower than the melting point by supplying hot water to the jacket 20 and the heating zone (jacket) 8 provided at the bottom portion of the vessel. Hot water is continuously supplied to the heating zone 7 of the suction pipe throughout the entire process.

FIG. 6(B) shows the state at the midway of solidification after initiating the solidification from the stage shown in FIG. 6(A). In this state, cold water is supplied to the jacket 20 while continuing the rotation of the magnetic rotator 6 and stopping the supply of hot water to the heating zone 8. At this stage, the solidification proceeds in a manner similar to the case explained with reference to the operation shown in FIG. 4(B). That is, the solidification boundary B gradually advances towards the center of the vessel while maintaining the tubular shape and reducing the diameter.

Similar to FIG. 4(C), FIG. 6(C) shows the operation of drawing out the residual liquid RL remaining in the central portion of the vessel through the suction pipe 5. The state of supplying hot water or cold water is substantially the same as that shown in FIG. 6(B), but hot water may be supplied to the heating zone 8 provided at the bottom portion of the vessel, so that the residual liquid RL may not be solidified at the bottom portion of the vessel.

FIG. 6(D) shows a state in which the solidified phase remaining in the vessel is remolten after the residual liquid RL is drawn out in the previous state. The remelting is performed by the same operation shown in FIG. 6(A), and the similar process steps can be repeated thereafter.

It is preferred that the seed crystals of gallium are present on the inner wall of the vessel on shifting from the stage shown in FIG. 6(A) or 6(D) to the stage shown in FIG. 6(B). If no seed crystal exists on supplying cold water to the jacket 20 to initiate the solidification, the liquid phase would be supercooled. If the solidification is allowed to proceed from such a supercooled state, the efficiency of refining would be lowered.

Figure 7:
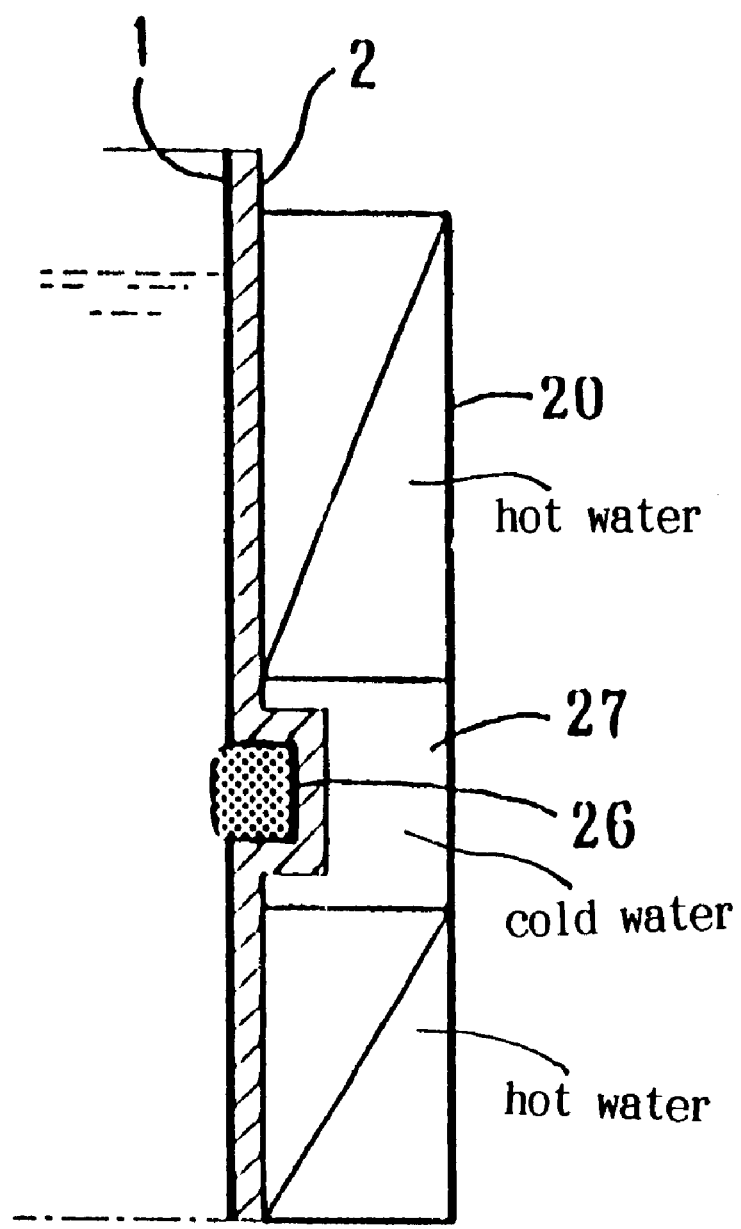
FIG. 7 is a schematically drawn cross section view showing the structure of the wall portion of the vessel provided as a means for reserving a seed crystal on initiating solidification.

FIG. 7 shows a means for reserving the seed crystals. Referring to FIG. 7, a concave portion 26 is provided to a part of the inner wall 1 of the vessel 2, and a cold water box 27 is provided independent to the jacket 20 in such a manner that the cold water box 27 may surround the concave portion 26. By using such a constitution, cold water is supplied to the cold water box 27 even while hot water is flown through the jacket 20. In this manner, solidified phase of gallium can be reserved inside the concave portion 26, so that it may function as a seed crystal at the initiation of solidification and prevent the occurrence of supercooling on the liquid phase.

Instead of the means shown in FIG. 7, a pipe supplied with cold water may be inserted from the upper portion of the vessel 2 to the vicinity of the inner wall 1 of the vessel. Thus, a solidified phase which functions as a seed crystal can be formed on the surface of the pipe. In addition, supercooling can be prevented by feeding granules of solid gallium as seed crystals in the vicinity of the inner wall of the vessel.

In accordance with the process for refining gallium using the apparatus above, metallic gallium improved in purity can be obtained every time the refining process is repeated. Thus, a metallic gallium having a purity of not only 6N, but also 7N, or even higher in some cases, can be obtained at a never achieved high yield. The fact that a metallic gallium having such a high purity is available by an industrially advantageous process greatly contributes to the preparation of a GaAs single crystal; particularly, by considering the process for refining gallium according to the present invention from a different viewpoint, this method can be regarded as a process for concentrating impurities in gallium. That is, the impurity concentration in metallic gallium can be specified by applying this process; hence, the process according to the present invention provides a raw metallic gallium material highly advantageous in preparing a GaAs single crystal. In other words. the impurities contained in trace quantities in gallium, their quantitative analysis has not been possible by glow discharge mass spectrometer (GDMS), can be recognized by the process according to the present invention as described below. The fact that the concentration of each of the impurity element can be recognized means that the contents of elements which function as acceptors and donors when incorporated into a GaAs single crystal can be presumed, and this is greatly advantageous in obtaining a GaAs single crystal of higher quality.

For instance, let us suppose a 7N metallic gallium is obtained industrially by using the refining apparatus according to the present invention. The fact that a metallic gallium having a purity as high as 7N is industrially available is itself surprising from the viewpoint of the conventional technological level; however, reliable quantitative analysis obtainable on such a metallic gallium by using a conventional GDMS is, as described hereinbefore, in the level of, for instance, 0.1 ppm or higher for Ge, 0.2 ppm or higher for Au, 0.01 ppm or higher for most of the other elements, and, for the impurities present at a concentration lower than these levels, the error level becomes too large (still, however, the metallic gallium can be defined as having a purity of 7N) according to the above-described definition. This signifies that the analysis performed by using GDMS fails to quantitatively identify the content of acceptor type elements or donor type elements. The process according to the present invention enables the quantitative identification of acceptor type and donor type elements.

More specifically, when the 7N metallic gallium above is subjected to the apparatus and the process for refining gallium according to the present invention, the residual liquid (i.e., Ga containing impurities at a high concentration; referred to hereinafter as "impurity-concentrated Ga") which remains in small quantity at the central portion of the vessel can be sampled and analyzed by using GDMS. Since the concentration of each of the impurity elements are higher for this sample, quantitative analysis is now possible by using GDMS. Then, the group of elements quantitatively detected by GDMS can be classified into Group A elements, i.e., the acceptor type elements, and Group B elements, i.e., the donor type elements. By taking the difference between the total concentration of Group A elements and that of Group B elements, it has been found that the 7N metallic gallium yielding the difference at a value not higher than a predetermined level is particularly favorable for the starting Ga material for preparing a GaAs single crystal having a high resistivity. Similarly, it has been found that such a metallic gallium is particularly preferable for preparing a GaP single crystal.

In further detail, when subjecting metallic gallium to a test defined as "Test method for impurity-concentrated Ga" herein, the impurity-concentrated Ga is obtained as a sample to be analyzed by GDMS, and from the analytical results, a difference $\Delta C = |\Sigma An - \Sigma Bn|$, where $\Sigma An$ represents the total quantity of the group A components (B, Na, Mg, K, Ca, Cr, Mn, Fe, Co, Ni, Cu, Zn, Cd, Au, Hg, Pb, and Bi), and $\Sigma Bn$ represents the total quantity of the group B components (F, Si, S, Cl, Ge, Se, Sn, and Te) can be obtained; then, it has been found that, as is shown in the Examples hereinafter, if the difference $\Delta C$ is 5 ppm by atomic or lower, the metallic Ga enables stable preparation of GaAs single crystal having a higher resistivity than any one,in the prior art.

The conditions utilized in the apparatus and the process for refining Ga according to the present invention are specified in "Test method for impurity-concentrated Ga" defined herein to establish a testing method. As the testing apparatus, firstly, there is used an apparatus for refining gallium comprising a vessel having a cylindrical inner wall made of a 3 mm thick SUS304 steel sheet provided with a 0.3 mm thick fluororesin coated inner wall plane, the vessel having an inner radius of 60 mm and a height of 40 mm, a cooling zone attached to the outer peripheral plane of the vessel, a suction pipe installed to the central portion of the vessel, and a magnetic rotator provided to the lower portion of the vessel. A lid is provided air-tight to the vessel so that the inside of the vessel can be purged with an inert gas. The inner wall side of the SUS304 steel sheet is provided with a fluororesin coating in order to prevent the contamination from SUS304. As the fluororesin, preferred is PFA (tetrafluoroethylene-perfluoroalkoxyethylene copolymer), but is not particularly limited thereto, and any type is acceptable so long as it prevents contamination from SUS304. The SUS304 is a stainless steel which contains, all percentages expressed by weight, 0.08% or less C, 1.00% or less Si, 2.00% or less Mn, 0.045% or less P, 0.030% or less S, 8.00 to 10.50% Ni, 18.00 to 20.00% Cr, and balance Fe with unavoidable impurities.

The cooling zone is a annular jacket 3 which can continuously flow cold water as described in FIG. 1, and the height thereof is the same as that of the vessel, i.e., 40 mm. The annular jacket is a tube having an inner radius of 5 mm and comprises a double tube consisting of an inner tube using the wall of the vessel itself and an outer tube made of a 3 mm thick stainless steel sheet (SUS304 steel sheet) similar to that used for the vessel. The upper portion and the bottom portion of the jacket are both produced by using a 3 mm thick SUS304 steel sheet. The suction pipe is installed movable in the upward and downward directions through the lid of the vessel, and a member corresponding to the heating zone 7 through which hot water is flown, as described in FIG. 1, is provided to the outer peripheral plane thereof. Preferably, a member corresponding to the heating zone 8 shown in FIG. 1 is provided at the bottom of the vessel, but an electric heater may be used in the place thereof.

The test is performed by using the testing apparatus above, and the vessel of the apparatus is filled with a raw Ga material in liquid state at a quantity as such that it amounts to 30 mm in height inside the vessel while purging the space inside the vessel with an inert gas to maintain the pressure inside the vessel at a value slightly higher than the atmospheric pressure. Then, while applying a circular flow of 100±10 rpm to the liquid raw Ga material by using a magnetic rotator, the liquid raw Ga material is maintained at a temperature of 29.6±0.5° C., and a cooling water is passed through the cooling zone at a temperature of 5° C., thereby proceeding solidification of the liquid at a solidification rate as such that the entire liquid may solidify in 60±5 minutes from the inner wall of the vessel towards the central portion of the vessel. The solidification rate above can be set easily by trial tests comprising repetition of solidification and melting while changing the flow rate of the cooling water and the supply rate of heat for melting the solidified product. In the practical test for sampling the impurity-concentrated Ga, the solidification is allowed to proceed under the conditions set above, and sampling of the liquid phase through the suction pipe is performed when the radius of the liquid phase remaining at the central portion of the vessel becomes 20 mm. The liquid phase thus sampled is denoted as the impurity-concentrated Ga.

The thus sampled impurity-concentrated Ga is then subjected to analysis using GDMS to count the content of each of the impurity elements. If the thus obtained $\Delta C = |\Sigma An - \Sigma Bn|$ is 5 ppm by atomic or lower, the metallic gallium subjected to the test is an approved product suitable for use as the raw Ga material for preparing a compound semiconductor, for instance, a product particularly preferred for use in the preparation of a GaAs single crystal.

As described above, the present invention not only enables the production of high purity metallic gallium having a purity of 6N or 7N, but also provides a metallic gallium suitable for use in the preparation of high purity GaAs single crystal provided with the prediction on the distribution of impurity elements functioning as acceptors and of impurity elements functioning as donors.

As explained below, the aforementioned fact is extremely advantageous in preparing a semi-insulating GaAs single crystal.

A GaAs single crystal requires a resistivity of $1 \times 10^7$ Ω·cm or higher, but the resistivity changes depending on the number of impurities. In such a case, the behavior is different depending on whether the impurity functions as an acceptor or a donor, but the difference between the number of acceptors and donors is related with the resistivity.

Figure 8:
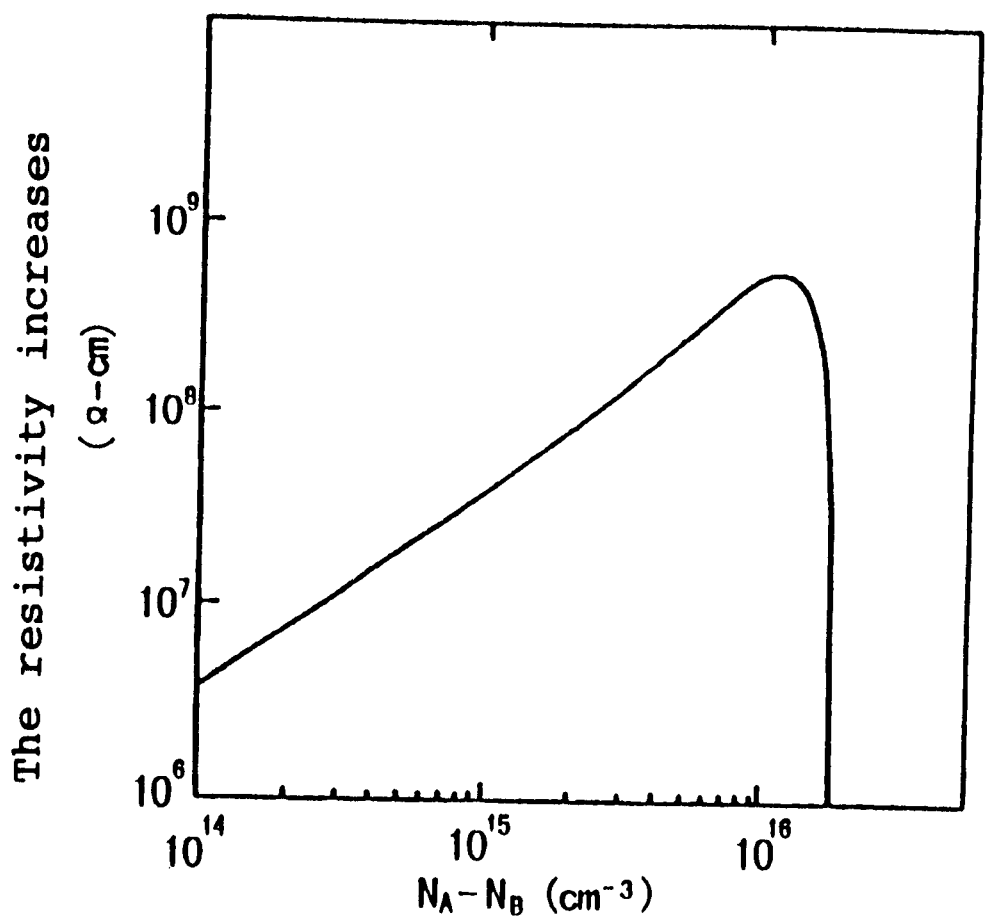
FIG. 8 is a diagram showing the relation between the resistivity of a single crystal GaAs and the difference $N_A - N_B$ between the total quantity $N_A$ of Group A impurity elements (acceptors) and the total quantity $N_B$ of Group B impurity elements (donors).

For instance, FIG. 8 shows the relation between the resistivity of a single crystal GaAs and the difference $N_A - N_B$ between the total quantity $N_A$ of Group A impurity elements (acceptors) and the total quantity $N_B$ of Group B impurity elements (donors), wherein $N_A - N_B$ is taken as the abscissa and the resistivity of the GaAs single crystal is taken as the ordinate. The resistivity increases from $1\times10^7$ Ω·cm for a difference $N_A-N_B$ of about $3\times10^{14}/cm^3$, but it drops abruptly with the difference $N_A-N_B$ exceeding a value of about $1\times10^{16}/cm^3$ to indicate that the GaAs single crystal becomes electrically conductive. This phenomenon has been utilized heretofore; for instance, elements for increasing $N_B$ were added in the case the impurity elements include high $N_A$, and on the contrary, in the case $N_B$ was high, impurities for increasing $N_A$ were added to control the difference $N_A-N_B$. This operation is known as dope control of impurities.

In accordance with the present invention, a semi-insulating GaAs single crystal having a resistivity of $1\times10^7$ Ω·cm or higher can be obtained without performing the dope control of the impurities. More specifically, the present invention provides an advantageous effect of producing a semi-insulating GaAs single crystal without doping any impurities. It can be understood according to the present invention that, if the value $\Delta C=|\Sigma An-\Sigma Bn|$ obtained by analyzing an impurity-concentrated Ga using GDMS is 5 ppm by atomic or lower, a GaAs single crystal prepared by using this metallic gallium results in a difference $N_A-N_B$ falling in the range of from $3\times10^{14}$ to $1\times10^{16}/cm^3$.

In this case, it is particularly preferred that the impurity-concentrated Ga yields a GDMS analytical value $\Sigma An$ of, for instance, 1 ppm by atomic or lower, and furthermore, it is still more preferred that $\Sigma Bn$ is, for instance, 1 ppm by atomic or lower. In accordance with the present invention and as shown in Examples 3 and 4 below, a high purity metallic Ga for preparing GaAs single crystal satisfying such requirements is available. As a matter of course, the present invention provides high purity metallic gallium suitable not only for GaAs single crystals, but also for preparing Ga based compound semiconductors inclusive of GaP, GaN, etc.

EXAMPLES

Example 1

A raw gallium material containing impurities at concentrations shown in Table 1 was refined by using an apparatus shown in FIG. 1. For the refining operation, cold water at a temperature of 5° C. was used for the water to be flown through the water-cooling jacket 3, and hot water at a temperature of 70° C. was used for the water to be flown through the hot water coil 4, hot water spiral pipe 8, and the hot water pipe 7. The temperature of the liquid phase L during solidification was proceeded was controlled to fall in the range of 29.6±0.5° C. A rare earth magnet was used for the magnet of the rotator 6, and the rotation speed of the liquid phase on the initiation of solidification was controlled to be 100 rpm by setting the revolution of the magnet to a constant rate of 500 rpm. Gaseous nitrogen was introduced into the vessel 2 provided with a lid, and the entire apparatus was operated inside a clean room of Class 100 level (set at a temperature of 35° C.).

A 150-kg portion of raw gallium material was charged inside the stainless steel vessel 2 having an inner radius of 200 mm and a height of 300 mm, made of a SUS304, and the process steps A to D shown in FIG. 4 was repeated 7 times. The refining took 33 hours to complete the operation. As shown in Table 1, 110 Kg of refined gallium and 40 Kg of separated gallium were obtained as a result. The separated gallium was collected inside the ladle 16 set inside the vacuum vessel 15. The impurities were analyzed by using GDMS.

TABLE 1

|  | Weight | Impurity (ppm) | | | | | | | | | |
|---|---|---|---|---|---|---|---|---|---|---|---|
|  | kg | Al | Si | P | Cl | K | Ca | Cr | Fe | Ni | Cu |
| Raw gallium material | 150 | 0.02 | 0.25 | <0.01 | 0.15 | 0.03 | 0.05 | 0.05 | 0.06 | 0.04 | 1.8 |
| Refined gallium | 110 | <0.01 | 0.02 | <0.01 | 0.02 | <0.01 | <0.01 | <0.01 | <0.01 | <0.01 | <0.01 |

|  | Weight | Impurity (ppm) | | | | | | | | |
|---|---|---|---|---|---|---|---|---|---|---|
|  | kg | Zn | Ge | As | In | Sn | Au | Hg | Pb | Total |
| Raw gallium material | 150 | 4.8 | <0.1 | <0.01 | 1.4 | 18 | <0.2 | 1.9 | 3.9 |  |
| Refined gallium | 110 | <0.01 | <0.1 | <0.01 | <0.01 | <0.01 | <0.2 | <0.01 | <0.01 | 0.04 |

Note)
Impurities were analyzed using GDMS (glow discharge mass spectrometer).

As shown in Table 1, a 7-nine high purity gallium was pared from a 4-nine raw gallium material at a yield of 73%.

Example 2

Refining operation was performed in the same manner as described in Example 1, except for using a raw gallium material differing in origin. The refining operation was repeated 7 times and it took a duration of 24 hours to complete the operation. The results are shown in Table 2. The impurities were analyzed by using GDMS.

TABLE 2

| | Weight | Impurity (ppm) | | | | | | | | | |
|---|---|---|---|---|---|---|---|---|---|---|---|
| | kg | Al | Si | P | Cl | K | Ca | Cr | Fe | Ni | Cu |
| Raw gallium material | 150 | 0.02 | 0.13 | <0.01 | 0.12 | 0.05 | 0.08 | 0.05 | 0.12 | 0.06 | 2.5 |
| Refined gallium | 122 | <0.01 | 0.01 | <0.01 | 0.02 | <0.01 | <0.01 | <0.01 | <0.01 | <0.01 | <0.01 |

| | Weight | Impurity (ppm) | | | | | | | |
|---|---|---|---|---|---|---|---|---|---|
| | kg | Zn | Ge | As | In | Sn | Au | Hg | Pb | Total |
| Raw gallium material | 150 | 0.52 | <0.1 | <0.01 | 1.4 | 25 | 0.25 | 2.4 | 8.1 | 40.80 |
| Refined gallium | 122 | <0.01 | <0.1 | <0.01 | <0.01 | <0.01 | <0.2 | <0.01 | <0.01 | 0.03 |

Note)
Impurities were analyzed using GDMS (glow discharge mass spectrometer).

In this example again, as shown in Table 2, a 7-nine high purity gallium was prepared from a 4-nine raw gallium material at a yield of 81%.

Example 3

Refining operation was performed in the same manner as described in Example 1, except for using a raw gallium material (4N) having a chemical analysis data obtained by GDMS as shown in Table 3. The refining operation was repeated 7 times. The GDMS analytical results for the thus obtained refined gallium (7N) are shown in the column of refined gallium of Table 3.

The refined gallium (7N) thus obtained was subjected to the test defined in the present specification as "Test method for impurity-concentrated Ga". More specifically, the test was performed by using an apparatus for refining gallium comprising a vessel having a cylindrical inner wall made of a 3 mm thick SUS304 steel sheet and provided with an inner wall plane coated with a fluororesin (PFA: tetrafluoroethylene-perfluoroalkoxyethylene copolymer) 0.3 mm in thickness, the vessel having an inner radius of 60 mm and a height of 40 mm, a cooling zone attached to the outer peripheral plane of the vessel, a suction pipe installed at the central portion of the vessel, and a magnetic rotator provided to the lower portion of the vessel. Then, the vessel of the apparatus was filled with the refined gallium (7N) in liquid state at a quantity as such that it amounts to 30 mm in height inside the vessel while purging the space inside the vessel with gaseous nitrogen. Subsequently, while applying a circular flow of 100±10 rpm to the liquid Ga material by using a magnetic rotator, the liquid Ga was maintained at a temperature of 29.6±0.5° C., and a cooling water was passed through the cooling zone at a temperature of 5° C., thereby proceeding solidification of the liquid at a solidification rate as such that the entire liquid may solidify in 60±5 minutes from the inner wall of the vessel towards the central portion of the vessel. Thus, sampling of the liquid phase (impurity-concentrated Ga) through the suction pipe was performed when the radius of the liquid phase remaining at the central portion of the vessel became 20 mm.

The thus sampled impurity-concentrated Ga was then subjected to analysis using GDMS to obtain the content of each of the impurity elements. As a result, the values given in the column of impurity-concentrated Ga (analytical values obtained by GDMS) of Table 3 were obtained. The DMS values (ppm by weight; referred to hereinafter as "wt·ppm") for each of the impurities in the impurity-concentrated Ga were reduced to values expressed in terms of ppm by atomic (referred to hereinafter as "at·ppm") in accordance with the conversion equation below, and the reduced values are given in the column of impurity-concentrated Ga (reduced values) of Table 3.

Concentration (at·ppm) of element $n$=Concentration (wt·ppm) of element $n$×atomic weight of Ga (69.72)/atomic weight of element $n$ As a result, the following values were obtained: $\Sigma An = 0.628$ at·ppm and $\Sigma Bn = 0.694$ at·ppm. Thus, $\Delta C = |\Sigma An - \Sigma Bn| = 0.065$ at·ppm was obtained.

TABLE 3

(Example 3)

| Impurity element | Raw gallium material GDMS value (wt. ppm) | Refined gallium (7 times) GDMS value (wt. ppm) | Impurity-concentrated Ga GDMS value (wt. ppm) | Impurity-concentrated Ga Reduced value (at. ppm) | |
|---|---|---|---|---|---|
| B | 0.02 | <0.01 | 0.02 | 0.129 | Group A |
| Na | 0.68 | <0.01 | 0.03 | 0.091 | $\Sigma An = 0.628$ |
| Mg | 0.9 | <0.01 | 0.03 | 0.086 | |
| K | 0.47 | <0.01 | 0.03 | 0.053 | |
| Ca | 0.35 | <0.01 | 0.02 | 0.035 | |
| Cr | 1.1 | <0.01 | 0.01 | 0.013 | |
| Mn | 1.2 | <0.01 | 0.01 | 0.013 | |
| Fe | 1.2 | <0.01 | 0.01 | 0.012 | |

TABLE 3-continued (Example 3)

| Impurity element | Raw gallium material GDMS value (wt. ppm) | Refined gallium (7 times) GDMS value (wt. ppm) | Impurity-concentrated Ga GDMS value (wt. ppm) | Impurity-concentrated Ga Reduced value (at. ppm) | | |
|---|---|---|---|---|---|---|
| Co | 0.5 | <0.01 | 0.01 | 0.012 | | |
| Ni | 1.2 | <0.01 | 0.01 | 0.012 | | |
| Cu | 1.2 | <0.01 | 0.01 | 0.011 | | |
| Zn | 3.5 | <0.01 | 0.01 | 0.011 | | |
| Mo | <0.01 | <0.01 | 0.01 | 0.007 | | |
| Cd | 1.2 | <0.1 | 0.10 | 0.062 | | |
| Au | <0.2 | <0.2 | 0.20 | 0.071 | | |
| Hg | 1.3 | <0.01 | 0.01 | 0.003 | | |
| Pb | 2.5 | <0.01 | 0.01 | 0.003 | | |
| Bi | 0.8 | <0.01 | 0.01 | 0.003 | | |
| F | 0.01 | <0.01 | 0.03 | 0.110 | Group B | |
| Si | 0.5 | <0.01 | 0.05 | 0.124 | $\Sigma Bn = 0.694$ | |
| S | 0.2 | <0.01 | 0.04 | 0.087 | | |
| Cl | 0.15 | 0.03 | 0.12 | 0.236 | | |
| Ge | <0.1 | <0.1 | 0.10 | 0.096 | | |
| Se | 0.1 | <0.01 | 0.02 | 0.018 | | |
| Sn | 20.0 | <0.01 | 0.03 | 0.018 | | |
| Te | 0.05 | <0.01 | 0.01 | 0.005 | | |

$\Delta C = |\Sigma An - \Sigma Bn| = 0.065$ at. ppm

Example 4

By using the same raw gallium material as that used in Example 3, a process similar to that described in Example 3 was performed, except for repeating the refining operation for 5 times. Thus was obtained a refined gallium with GDMS analytical results given in the column of refined gallium in Table 4. Similar to the refined gallium obtained in Example 3, the product thus obtained had a purity of 7N in terms of GDMS value. Similarly, the refined gallium (7N) was subjected to "Test method for impurity-concentrated Ga". The thus sampled impurity-concentrated Ga was then subjected to analysis using GDMS to obtain the content of each of the impurity elements. As a result, the values given in the column of impurity-concentrated Ga (GDMS value) of Table 4 were obtained. The DMS values (wt·ppm) for each of the impurities in the impurity-concentrated Ga were reduced to values (at·ppm) in a manner similar to that of Example 3, and the reduced values are given in the column of impurity-concentrated Ga (reduced values) of Table 4.

As a result, the following values were obtained: $\Sigma An = 1.172$ at·ppm and $\Sigma Bn = 0.672$ at·ppm. Thus, $\Delta C = |\Sigma An - \Sigma Bn| = 0.500$ at·ppm was obtained.

On comparing the results with those of Example 3, it can be understood that, although refined gallium samples having the same GDMS analytical values of 7N are used, the product of Example 4 obtained by repeating the refining operation for 5 times yields higher values for $\Sigma An$ and $\Sigma Bn$, and also for $\Delta C$, as compared with those of the product of Example 3 obtained by repeating the refining operation for 7 times.

TABLE 4

(Example 4)

| Impurity element | Raw gallium material GDMS value (wt. ppm) | Refined gallium (5 times) GDMS value (wt. ppm) | Impurity-concentrated Ga GDMS value (wt. ppm) | Impurity-concentrated Ga Reduced value (at. ppm) | | |
|---|---|---|---|---|---|---|
| B | 0.02 | <0.01 | 0.02 | 0.129 | Group A | |
| Na | 0.68 | <0.01 | 0.08 | 0.243 | $\Sigma An = 1.172$ | |
| Mg | 0.9 | <0.01 | 0.10 | 0.287 | | |
| K | 0.47 | <0.01 | 0.07 | 0.125 | | |
| Ca | 0.35 | <0.01 | 0.04 | 0.070 | | |
| Cr | 1.1 | <0.01 | 0.02 | 0.027 | | |
| Mn | 1.2 | <0.01 | 0.02 | 0.025 | | |
| Fe | 1.2 | <0.01 | 0.03 | 0.037 | | |
| Co | 0.5 | <0.01 | 0.02 | 0.024 | | |
| Ni | 1.2 | <0.01 | 0.02 | 0.024 | | |
| Cu | 1.2 | <0.01 | 0.01 | 0.011 | | |
| Zn | 3.5 | <0.01 | 0.02 | 0.021 | | |
| Mo | <0.01 | <0.01 | 0.01 | 0.007 | | |
| Cd | 1.2 | <0.1 | 0.10 | 0.062 | | |
| Au | <0.2 | <0.2 | 0.20 | 0.071 | | |
| Hg | 1.3 | <0.01 | 0.01 | 0.003 | | |
| Pb | 2.5 | <0.01 | 0.01 | 0.003 | | |
| Bi | 0.8 | <0.01 | 0.01 | 0.003 | | |
| F | 0.01 | <0.01 | 0.03 | 0.110 | Group B | |

TABLE 4-continued (Example 4)

| Impurity element | Raw gallium material GDMS value (wt. ppm) | Refined gallium (5 times) GDMS value (wt. ppm) | Impurity-concentrated Ga GDMS value (wt. ppm) | Impurity-concentrated Ga Reduced value (at. ppm) | |
|---|---|---|---|---|---|
| Si | 0.5 | <0.01 | 0.05 | 0.124 | ΣBn = 0.672 |
| S  | 0.2 | <0.01 | 0.04 | 0.087 | |
| Cl | 0.15 | 0.03 | 0.10 | 0.197 | |
| Ge | <0.1 | <0.1 | 0.10 | 0.096 | |
| Se | 0.1 | <0.01 | 0.02 | 0.018 | |
| Sn | 20.0 | <0.01 | 0.06 | 0.035 | |
| Te | 0.05 | <0.01 | 0.01 | 0.005 | |

ΔC = |ΣAn − ΣBn| = 0.500 at. ppm

Comparative Example 1

A commercially available metallic gallium with a nominal purity of 6N was analyzed by GDMS to obtain the analytical values given in the column of commercially available gallium in Table 5. The commercially available gallium (6N) was subjected to "Test method for impurity-concentrated Ga" in a manner similar to that of Example 3. The thus sampled impurity-concentrated Ga was then subjected to analysis using GDMS to obtain the content of each of the impurity elements. As a result, the values given in the column of impurity-concentrated Ga (GDMS value) of Table 5 were obtained. The DMS values (wt·ppm) for each of the impurities in the impurity-concentrated Ga were reduced to values (at·ppm) in a manner similar to that of Example 3, and the reduced values are given in the column of impurity-concentrated Ga (reduced values) of Table 5.

As a result, the following values were obtained: ΣAn= 0.600 at·ppm and Bn=5.798 at·ppm. Thus, ΔC=|ΣAn−ΣBn|= 5.198 at·ppm was obtained.

Comparative Example 2

The same test as that of Comparative Example 1 was performed, except for using a different commercially available metallic gallium having a nominal purity of 6N. The results are given in Table 6 in a manner similar to those of Comparative Example 1, and the following values were obtained: ΣAn=5.997 at·ppm, ΣBn=0.630 at·ppm, and ΔC=|ΣAn−ΣBn|=5.367 at·ppm.

TABLE 5

(Comparative Example 1)

| Impurity element | Commercially available gallium 6N GDMS value (wt. ppm) | Impurity-concentrated Ga GDMS value (wt. ppm) | Impurity-concentrated Ga Reduced value (at. ppm) | |
|---|---|---|---|---|
| B  | <0.01 | 0.02 | 0.129 | Group A |
| Na | <0.01 | 0.03 | 0.091 | ΣAn = 0.600 |
| Mg | <0.01 | 0.02 | 0.577 | |
| K  | <0.01 | 0.03 | 0.053 | |
| Ca | <0.01 | 0.02 | 0.035 | |
| Cr | <0.01 | 0.01 | 0.013 | |
| Mn | <0.01 | 0.01 | 0.013 | |
| Fe | <0.01 | 0.01 | 0.012 | |
| Co | <0.01 | 0.01 | 0.012 | |
| Ni | <0.01 | 0.01 | 0.012 | |
| Cu | <0.01 | 0.01 | 0.011 | |
| Zn | <0.01 | 0.01 | 0.011 | |

TABLE 5-continued (Comparative Example 1)

| Impurity element | Commercially available gallium 6N GDMS value (wt. ppm) | Impurity-concentrated Ga GDMS value (wt. ppm) | Impurity-concentrated Ga Reduced value (at. ppm) | |
|---|---|---|---|---|
| Mo | <0.01 | 0.01 | 0.007 | |
| Cd | <0.1 | 0.10 | 0.062 | |
| Au | <0.2 | 0.20 | 0.071 | |
| Hg | <0.01 | 0.01 | 0.003 | |
| Pb | <0.01 | 0.01 | 0.003 | |
| Bi | <0.01 | 0.01 | 0.003 | |
| F  | <0.01 | 0.03 | 0.110 | Group B |
| Si | 0.2 | 0.8 | 1.986 | ΣBn = 5.798 |
| S  | 0.2 | 0.8 | 1.739 | |
| Cl | 0.15 | 0.60 | 1.180 | |
| Ge | <0.1 | 0.10 | 0.096 | |
| Se | <0.01 | 0.02 | 0.018 | |
| Sn | 0.1 | 1.0 | 0.587 | |
| Te | 0.02 | 0.15 | 0.082 | |

ΔC = |ΣAn − ΣBn| = 5.198 at. ppm

TABLE 6

(Comparative Example 2)

| Impurity element | Commercially available gallium 6N GDMS value (wt. ppm) | Impurity-concentrated Ga GDMS value (wt. ppm) | Impurity-concentrated Ga Reduced value (at. ppm) | |
|---|---|---|---|---|
| B  | <0.01 | 0.02 | 0.129 | Group A |
| Na | 0.1 | 0.31 | 0.940 | ΣAn = 5.998 |
| Mg | 0.2 | 0.60 | 1.721 | |
| K  | 0.1 | 0.27 | 0.481 | |
| Ca | 0.1 | 0.42 | 0.731 | |
| Cr | 0.1 | 0.45 | 0.603 | |
| Mn | <0.01 | 0.01 | 0.013 | |
| Fe | 0.05 | 0.51 | 0.637 | |
| Co | <0.01 | 0.01 | 0.012 | |
| Ni | 0.02 | 0.15 | 0.178 | |
| Cu | 0.01 | 0.07 | 0.077 | |
| Zn | 0.03 | 0.20 | 0.213 | |
| Mo | <0.01 | 0.01 | 0.007 | |
| Cd | <0.1 | 0.10 | 0.062 | |
| Au | <0.2 | 0.20 | 0.071 | |
| Hg | 0.02 | 0.10 | 0.035 | |
| Pb | 0.02 | 0.18 | 0.061 | |
| Bi | 0.01 | 0.08 | 0.027 | |
| F  | <0.01 | 0.02 | 0.073 | Group B |

TABLE 6-continued (Comparative Example 2)

| Impurity element | Commercially available gallium 6N GDMS value (wt. ppm) | Impurity-concentrated Ga GDMS value (wt. ppm) | Impurity-concentrated Ga Reduced value (at. ppm) | |
|---|---|---|---|---|
| Si | <0.01 | 0.05 | 0.124 | $\Sigma Bn = 0.630$ |
| S  | <0.01 | 0.04 | 0.087 | |
| Cl | 0.03  | 0.10 | 0.197 | |
| Ge | <0.1  | 0.10 | 0.096 | |
| Se | <0.01 | 0.02 | 0.018 | |
| Sn | <0.01 | 0.05 | 0.029 | |
| Te | <0.01 | 0.01 | 0.005 | |

$\Delta C = |\Sigma An - \Sigma Bn| = 5.367$ at. ppm

Example 5

Single crystals of GaAs were prepared in accordance with LEC (Liquid Encapsulated Czocralski) method described in Example 1 of Japanese patent application Hei11-098528 filed by the present applicants (assignors), by using each of the refined gallium obtained in Examples 3 and 4 and the commercially available metallic gallium shown in Comparative Examples 1 and 2 for the raw Ga material for preparing GaAs single crystal, and using commercially available high purity arsenic having a purity of 7N for the raw As material. The commercially available high purity arsenic (7N) was sampled and analyzed by using GDMS to find that the concentrations of all of the elements belonging to Group A and Group B were not higher than 0.01 ppm, the limit of quantitative analysis using GDMS.

The process for preparing GaAs single crystal by LEC method in accordance with the disclosure of Japanese patent application Hei11-098528 is briefly described below. In a PBN (Pyrolytic Boron Nitride) crucible were placed 5,000 g of a raw Ga material and 5,500 g of a raw As material, and after charging further thereon a liquid sealant ($B_2O_3$) with water content of 200 ppm by weight at a sufficient amount, the entire crucible was set inside a pressure vessel. Then, after introducing a gas of pure Ar pressurized to 37 kgf/cm$^2$ (≡3.6 MPa) into the pressure vessel, the PBN crucible was heated by using a heater provided inside the pressure vessel. In this manner, the raw Ga material was allowed to react with the raw As material inside the crucible to synthetically obtain polycrystalline GaAs.

The polycrystalline GaAs thus obtained inside the crucible was further heated to obtain a melt of GaAs. A pressure of 65 kgf/cm$^2$ (≡6.4 MPa) was attained inside the pressure vessel at this instance. The pressure was then reduced to 4 kgf/cm$^2$ (≡0.4 MPa), and the crucible was allowed to stand for 1 hour to degas the $B_2O_3$ layer. Then, pure gaseous nitrogen was introduced into the vessel to increase the pressure to 24 kgf/cm$^2$ (≡2.4 MPa), until an Ar/$N_2$ mixing ratio of 1/6 was attained, and was allowed to stand for 30 minutes. The pressure of the mixed gas was then reduced to 4 kgf/cm$^2$ (≡0.4 MPa), and was further left for 30 minutes. Pure gaseous nitrogen was introduced again into the vessel to increase the pressure to 24 kgf/cm$^2$ (≡2.4 MPa), until an Ar/$N_2$ mixing ratio of 1/36 was attained, and was allowed to stand for 30 minutes. Presumably, by thus controlling the gas pressure and the ratio of mixing gases, boron mixed into the GaAs melt can be reacted with pure gaseous nitrogen through $B_2O_3$, and is discharged out of the system in the form of boron nitride.

At this stage, a seed crystal was introduced downward into the crucible while rotating it at a rate of about 5 rpm, and was brought into contact with the surface of the GaAs melt. In this case, the crucible was also rotated at a rate of about 25 rpm, and upon completion of seeding, the seed crystal was pulled up to form a cone portion. Subsequently, a straight cylindrical body portion having a uniform crystal diameter was formed at a rate of 8 mm/hr while rotating it at a constant rate of 5 rpm, and a tail portion was formed to grow a GaAs single crystal. After being pulled up, the product was cooled to obtain a 4-inch diameter ingot of GaAs single crystal.

By employing the process above, GaAs single crystals were prepared while maintaining the same conditions, except for changing the raw Ga materials. Then, the resulting GaAs single crystals were subjected to the measurement of resistivity, and the results as follows were obtained depending on the difference in raw Ga materials.

| | Resistivity of GaAs single crystal |
|---|---|
| Refined Ga of Example 3 | $5 \times 10^7$ Ω·cm |
| Refined Ga of Example 4 | $2 \times 10^7$ Ω·cm |
| Commercially available Ga of Comparative Example 1 | $5 \times 10^4$ Ω·cm |
| Commercially available Ga of Comparative Example 2 | $1 \times 10^5$ Ω·cm |

From the results obtained above, it can be understood that although refined gallium samples having the same purity 7N were used, the product of Example 3 having a value of 0.065 at·ppm for $\Delta C=|\Sigma An-\Sigma Bn|$ as defined in "Test method for impurity-concentrated Ga" according to the present specification enabled a GaAs single crystal having a higher resistivity as compared with that having a $\Delta C$ value of 0.500 at·ppm obtained in Example 4. Furthermore, even though a purity of 6N was achieved, the commercially available metallic gallium (used in Comparative Examples 1 and 2) having a $\Delta C$ value exceeding 5 at·ppm failed to produce GaAs single crystals having a resistivity of $1 \times 10^7$ Ω·cm or higher.

Example 6

GaP crystals were prepared in accordance with a known SSD (Synthesis Solute Diffusion) process by using each of the refined gallium obtained in Examples 3 and 4 and the commercially available metallic gallium shown in Comparative Examples 1 and 2 for the raw Ga material for preparing GaP crystal, and using commercially available high purity phosphorus having a purity of 7N for the raw P material. The commercially available high purity phosphorus (7N) was sampled and analyzed by using GDMS to find that the concentrations for all of the elements belonging to Group A and Group B were not higher than 0.01 ppm, the limit of quantitative analysis using GDMS.

In performing the SSD process, 140 g of raw Ga material was charged into a 30-mm diameter quartz crucible provided with a support rod, and the crucible charged with the raw Ga material was vacuum sealed inside a quartz ampoule together with 70 g of a raw phosphorus material placed at the bottom of the same ampoule. Then, while heating the raw phosphorus material provided at the bottom of the ampoule to a temperature of 430° C., the inside of the crucible was heated to 900° C. and the inner pressure of the ampoule was maintained at 1 atm. In this manner, GaP crystals were allowed to precipitate on the bottom portion of the raw Ga material (melt) provided inside the crucible. Thus, sampling was made on the GaP crystal grown by this method at the stages in which the GaP crystal grew to a length of 10 mm and 50 mm (30 days after initiation of the synthesis), and measurements were made thereon to obtain the carrier density and the resistivity. As a result, the following values were obtained.

|  | (10-mm length) | (50-mm length) |
|---|---|---|
|  | Carrier density of GaP crystals (/cm$^3$) | |
| Refined Ga of Example 3 | $1.2 \times 10^{15}$ | $3.4 \times 10^{15}$ |
| Refined Ga of Example 4 | $1.8 \times 10^{15}$ | $4.8 \times 10^{15}$ |
| Commercially available Ga of Comparative Example 1 | $1.3 \times 10^{16}$ | $3.1 \times 10^{16}$ |
| Commercially available Ga of Comparative Example 2 | $1.1 \times 10^{16}$ | $2.8 \times 10^{16}$ |
|  | Resistivity of GaP crystals ($\Omega \cdot$ cm) | |
| Refined Ga of Example 3 | 40 | 12 |
| Refined Ga of Example 4 | 20 | 8 |
| Commercially available Ga of Comparative Example 1 | 2 | 1.3 |
| Commercially available Ga of Comparative Example 2 | 4 | 1.5 |

From the results above, it can be understood that although refined gallium samples having the same purity of 7N were used, the product of Example 3 enabled a GaP crystal having a lower carrier density and a higher resistivity as compared with that obtained in Example 4. Furthermore, even though a purity of 6N was achieved, the commercially available metallic gallium (used in Comparative Examples 1 and 2) having a value of $\Delta C = |\Sigma An - \Sigma Bn|$ as defined in "Test method for impurity-concentrated Ga" according to the present specification exceeding 5 at·ppm failed to produce GaP crystals having a carrier density of $1 \times 10^{16}$/cm$^3$ or lower and a resistivity of 5 $\Omega \cdot$cm or higher.

While the invention has been described in detail by making reference to specific examples, it should be understood that various changes and modifications can be made without departing from the scope and the spirit of the present invention.

What is claimed is:

1. In a process for separating impurities from a raw gallium material containing impurities, a process for refining gallium comprising progressively solidifying a raw gallium material provided in a liquid state inside a vessel while applying stirring, such that the diameter of a tubular solidification boundary gradually advances from the inner wall plane of the vessel towards the center of the vessel to reduce the diameter of the tubular solidification boundary, and separating the liquid phase remaining in the central portion of the vessel from the solidified phase before the entire raw material inside the vessel is solidified.

2. A process for refining gallium as claimed in claim 1, wherein stirring is applied by a magnetic field.

3. A process for refining gallium as claimed in claim 1, wherein stirring is applied by a magnetic field in such a manner that a circular flow is generated in the liquid phase in the circumferential direction.

4. In a process for separating impurities from a raw gallium material containing impurities, a process for refining gallium comprising progressively solidifying a raw gallium material provided in a liquid state inside a vessel while applying stirring, such that the diameter of a tubular solidification boundary gradually advances from the inner wall plane of the vessel towards the center of the vessel to reduce the diameter of the tubular solidification boundary, separating the liquid phase remaining in the central portion of the vessel from the solidified phase before the entire raw material inside the vessel is solidified, and then melting the solidified phase remaining in the vessel and repeating the same process steps above.

5. A process for refining gallium as claimed in claim 4, wherein a solid phase is reserved as a seed crystal on the inner wall plane of the vessel on melting the solidified phase.

6. An apparatus for refining gallium comprising a vessel having a cylindrical inner wall, a cooling zone attached to an outer peripheral plane of the vessel, a heating zone provided on an inner side of the inner wall of the vessel, a suction pipe installed at a central portion of the vessel, and a magnetic rotator placed on a lower side of the vessel.

7. An apparatus for refining gallium comprising a vessel having a cylindrical inner wall, a cooling and heating zone attached to an outer peripheral plane of the vessel, a suction pipe installed at a central portion of the vessel, and a magnetic rotator placed on a lower side of the vessel.

8. An apparatus for refining gallium as claimed in claim 7, wherein the cooling and heating zone is provided for a switching means for switching cold water and hot water to pass therethrough.

9. An apparatus for refining gallium as claimed in claim 6, wherein a heating zone is provided at a bottom portion of the vessel and to an outer periphery of the suction pipe.

10. An apparatus for refining gallium as claimed in claim 6, wherein a means for reserving a seed crystal is provided to the inner wall of the vessel or in the vicinity of said inner wall.

* * * * *